CONVERTIBLE RECORD-MAGAZINE RACK

Filed March 19, 1963 3 Sheets-Sheet 1

Inventor
RUSSELL O. STEFAN
by
Attorney

Inventor
RUSSELL O. STEFAN by [signature]

Attorney

Inventor
RUSSELL O. STEFAN by [signature]

Attorney

United States Patent Office
3,176,848
Patented Apr. 6, 1965

3,176,848
CONVERTIBLE RECORD-MAGAZINE RACK
Russell O. Stefan, Downey, Calif.
(10950 Vulcan St., South Gate, Calif.)
Filed Mar. 19, 1963, Ser. No. 266,266
4 Claims. (Cl. 211—40)

This invention relates to storage devices and particularly to racks for storing phonograph records.

It is an object of the invention to provide a simple inexpensive phonograph record rack, which may be shipped disassembled and readily assembled by the purchaser.

Another object is to provide such a rack which may be optionally assembled by the purchaser either to serve as a record rack or as a magazine rack.

A further object is to provide such a rack which is made up of a plurality of superimposed sections, each section of which, is optionally assemblable either to serve as a record rack or a magazine rack.

Still another object is to provide such a rack which may be optionally assembled as an end table embodying one or more racks each of which, may be optionally assembled either for storage of records or for storage of magazines.

The manner of accomplishing the foregoing objects as well as further objects and advantages, will be made manifest in the following description taken in connection with the accompanying drawings in which FIG. 1 is a perspective view of a preferred embodiment of the invention in which this incorporates two sections, one of which is superimposed upon and united with the other section, and with each of said sections assembled so as to function as a phonograph record rack.

Figure 8:
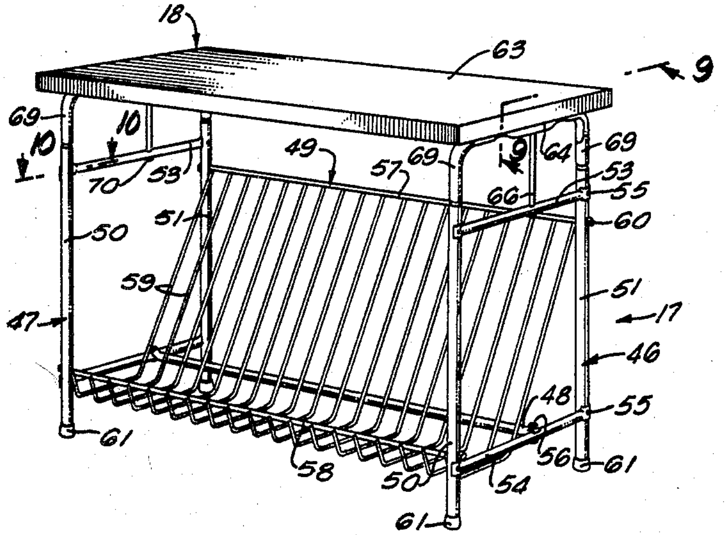
FIG. 8 is a perspective view illustrating the lower section of the two section rack shown in FIG. 6 combined with a table top superimposed thereon to produce a combined magazine rack and end table.
Figure 9:
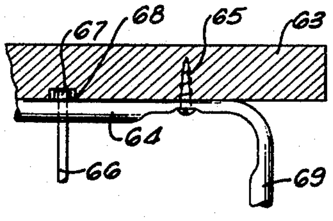
FIG. 9 is an enlarged fragmentary vertical sectional view taken on the line 9—9 of FIG. 8.
Figure 10:
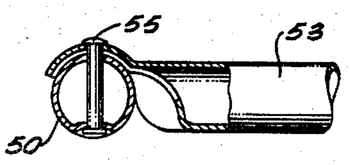
FIG. 10 is an enlarged fragmentary horizontal sectional view taken on the line 10—10 of FIG. 8.

Referring specifically to the drawings, the invention therein disclosed is seen to embrace a sectional convertible rack 15 including an upper rack section 16 and a lower rack section 17. The sectional rack 15 may include any desired number of the lower rack section 17, and the upper end of such a sectional rack 15 may be finished either by selecting an upper rack section 16 as the upper section thereof, or by applying to the uppermost lower rack section 17 embodied therein, a table-top section 18 (FIG. 8).

Figure 7:
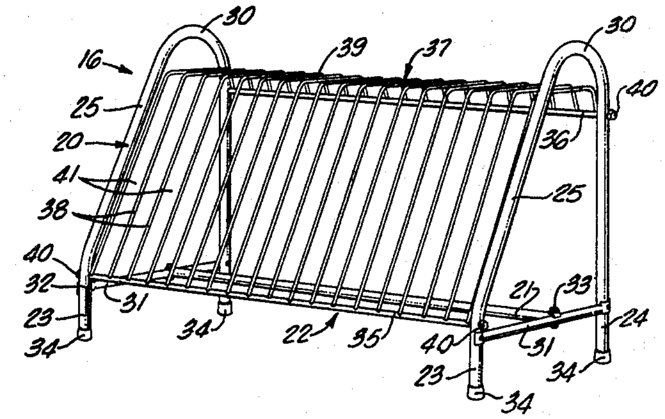
FIG. 7 is a perspective view of the upper rack section, shown in FIGS. 1 and 6, used alone as a one-story record rack.

The upper rack section 16 (which may be imployed by itself) has a convertible record-magazine rack as shown in FIG. 7, includes left and right rack ends 19 and 20, a transverse horizontal spacer bar 21 and a welded heavy steel wire grid 22.

Inasmuch as left and right rack ends 19 and 20 are reverse duplicates of each other, corresponding elements of these two structures will be identified by the same reference numerals. While rack ends 19 and 20 may be constructed in many different ways and out of various types of material, they are preferably fabricated from light, seamless metallic tubing to form open frames, each of which includes a front vertical member 23 and a back vertical member 24. These two vertical members are bent from opposite end portions of a single piece of seamless metal tubing, a middle portion of which forms a straight connecting member 25 which inclines upwardly and rearwardly at an angle of about 125 degrees from the upper end of said front vertical member 23, and connects with the upper end of back vertical member 24 by a relatively short radius bend 30 in said piece of tubing.

At points equidistant from the lower ends of front and back vertical members 23 and 24, flattened and arched end portions of a horizontal tubular member 31 are rigidly secured by rivets 32.

The transverse horizontal spacer bar 21 is preferably made of high grade seamless metal tubing and flattened and arched end portions of this bar are secured by short bolts 33 to horizontal members 31 of rack ends 19 and 20, at corresponding points therein. This manner of connecting spacer bar 21 to horizontal members 31 is limited to where upper rack section 16 is being assembled for use independently as a convertible record-magazine rack as shown in FIG. 7. When this rack section is so assembled, lower ends of front and back vertical members 23 and 24 of racks ends 19 and 20 are provided with soft plastic cups 34.

The grid 22 includes two parallel transverse horizontal bars 35 and 36, opposite end portions of which are threaded, and a multiple of guide rods 37 which are welded at their lower and upper ends respectively to said first and second grid bars, with said rods lying in uniformly space parallel planes. Upper end portions of front and back vertical members 23 and 24 of the rack ends 19 and 20 are drilled horizontally at aligned points in the two rack ends, to receive the threaded outer end portions of the horizontal grid bars 35 and 36, the first bar 35 normally being mounted in the pair of holes thus provided in the front vertical members 23 and the second grid bar 36 being mounted in the aligned holes provided in the back vertical members 24 of said rack ends. The guide rods 37 of grid 22 lie in a flat plane parallel with the rearwardly inclined connecting members 25 of the rack ends for a major portion of the length of said guide rods and until they reach a level above second horizontal grid bar 36, where said guide rods are bent to extend rearwardly in a horizontal plane for a short distance and are then bent dowwardly into tangent relation with said second horizontal grid bar to which said guide rods are then welded.

When the grid 22 has been assembled on the left and right rack ends 19 and 20 as above described, cap nuts 38 are screwed onto the outwardly extended threaded ends of the grid bars 35 and 36 so as to draw the end members 23 and 24 snugly against the endmost guide rods 37 of said grid. The endmost guide rods of the grid are located thereon so that, when the upper right section 16 is so assembled, the rack ends 19 and 20 thereof are rigidly held in parallel vertical planes and with the lower ends of all of the front and back vertical members 23 and 24 in a common plane so that the upper rack section 16 will sit flat on a horizontal floor as shown in FIG. 7.

Figures 1, 2, 3:
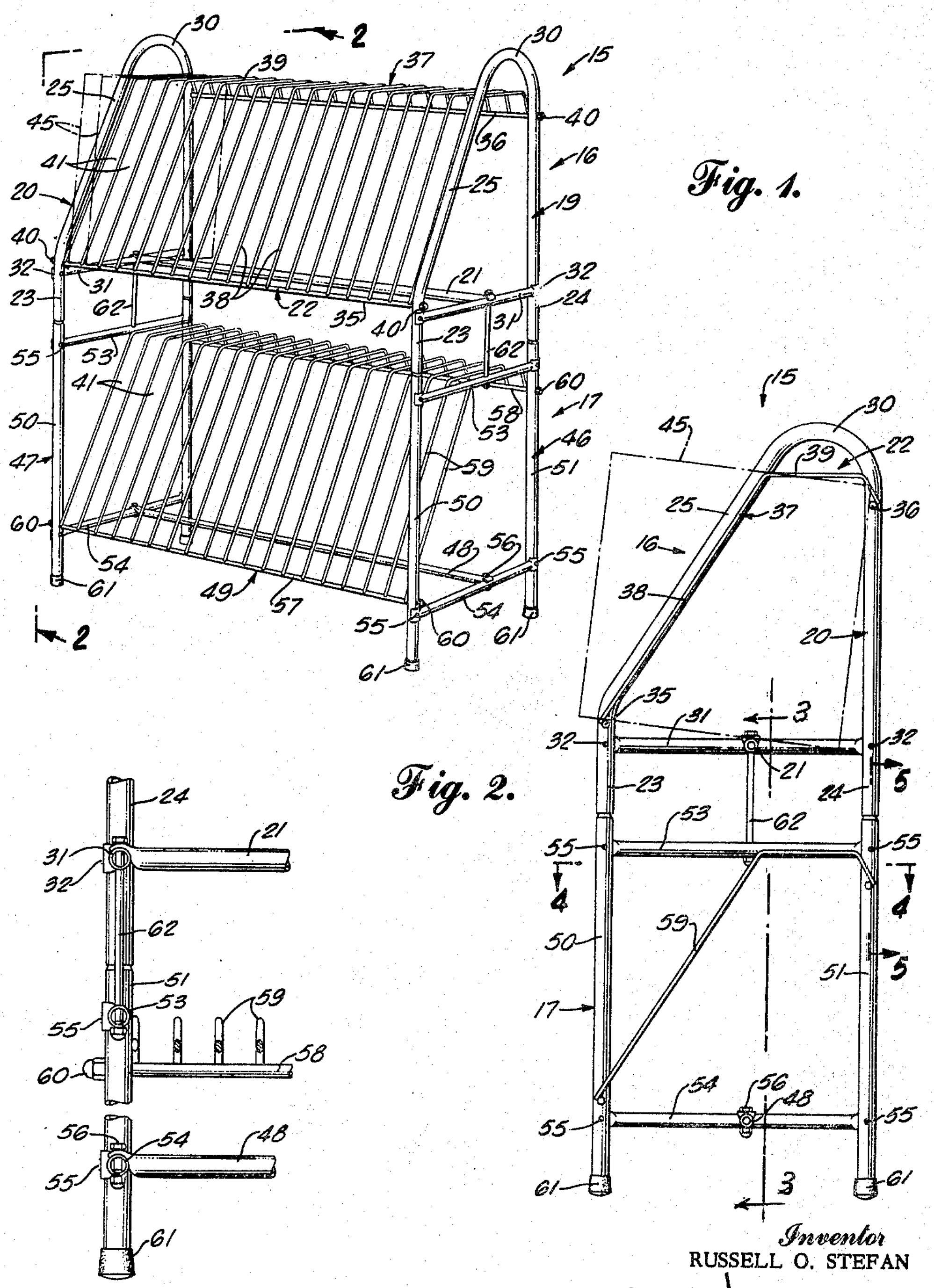
FIG. 2 is an enlarged vertical sectional view taken on the line 2—2 of FIG. 1.
FIG. 3 is a further enlarged fragmentary vertical sectional view taken on the line 3—3 of FIG. 2.
Figure 4:
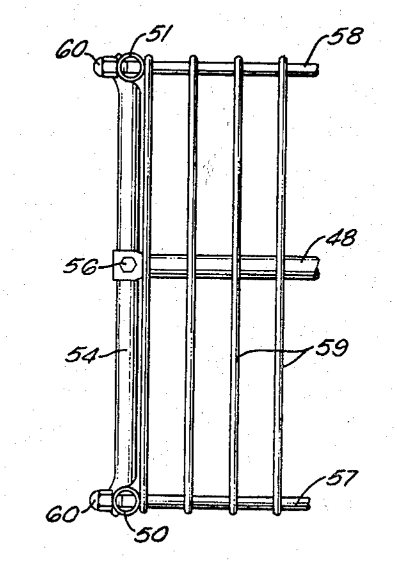
FIG. 4 is an enlarged fragmentary horizontal sectional view taken on the line 4—4 of FIG. 2.

The assembly of the upper rack section 16 in the manner above-described results in the formation of phonograph record filing pockets 41 between adjacent guide rods 37, a square, cardboard, record-containing envelope 45 being shown by broken lines in FIG. 2 as this rests in one of said pockets. Here it is seen that the envelope 45 is supported from beneath by the transverse horizontal spacer bar 21 and the first transverse horizontal grid bar 35 and inclines rearwardly to rest at its upper end against the second horizontal grid bar 36. The rods 37 being only about one-eight of an inch in diameter, they merely act as dividers of the record storing space between left and right rack ends 19 and 20 and assure that the record envelopes placed anywhere in the upper rack section 16 will lie in vertical planes parallel with the other record envelopes filed in said rack section.

Lower rack section 17 includes left and right open-frame rack ends 46 and 47, a transverse horizontal spacer bar 48 and a grid 49 which is identical with the grid 22.

Figure 5:
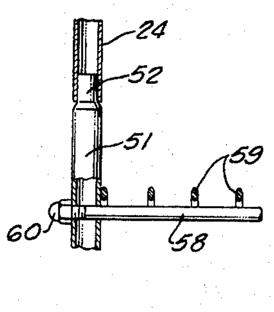
FIG. 5 is an enlarged fragmentary vertical sectional view taken on the line 5—5 of FIG. 2.
Figure 6:
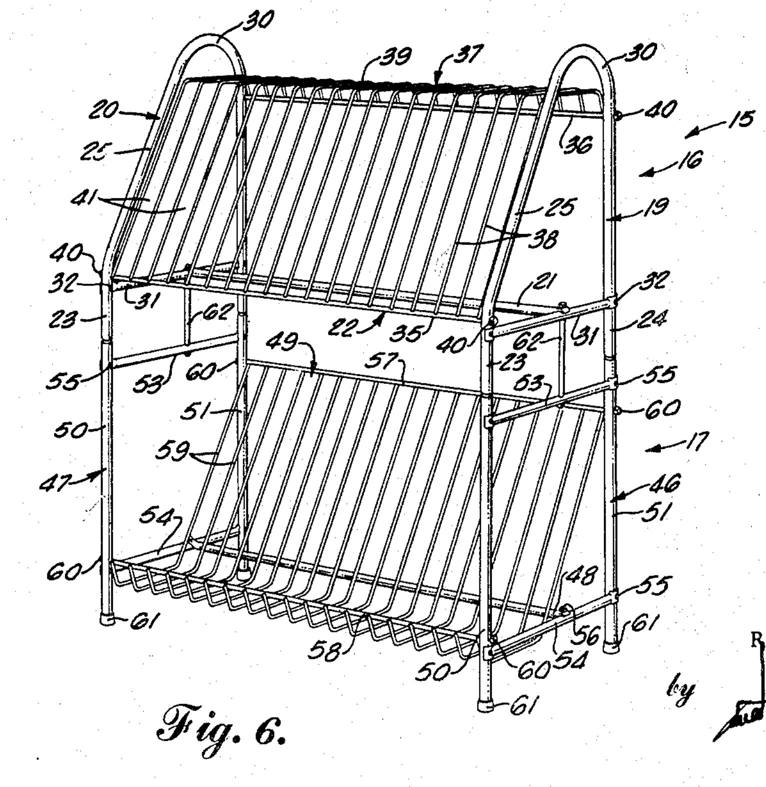
FIG. 6 is a view similar to FIG. 1 and illustrates the lower of said two superimposed sections assembled so as to function as a magazine rack.

The same materials and method of construction are employed in building the open frames comprised in rack ends 46 and 47 as were employed in building the rack ends 19 and 20. The rack ends 46 and 47 are reverse duplicates of each other, and each includes a front vertical member 50 and back vertical member 51 which is comprised of straight pieces of seamless metal tubing equal in length swedged at the upper ends to form axial tubular extensions 25 of reduced diameter which fit snugly into lower ends of vertical members 23 and 24 of upper rack section 16 when the latter is mounted on top of lower rack section 17 as shown in FIGS. 1, 5 and 6. Each of the rack ends 46 and 47 also includes upper and lower horizontal tubular members 53 and 54, flattened end portions of which are arched to fit outer faces of vertical members 50 and 51 and are rigidly secured to said members by rivets 55. The upper horizontal tubular member 53 connects the upper portions of front and back vertical members 50 and 51 close to the lower ends of tubular extensions 52 while lower portions of vertical members 50 and 51 are connected by lower horizontal tubular member 53 with the latter spaced above the lower ends of vertical members 50 and 51 exactly the same distance that horizontal member 31 is spaced above the lower ends of vertical members 23 and 24 of upper rack section 16.

Transverse horizontal spacer bar 48 is identical in construction to the spacer bar 21 and is secured by short bolts 56 to lower horizontal tubular members 54 at the same corresponding points therein that transverse spacer bar 21 is connected to horizontal tubular members 31 of the upper rack section 16.

The grid 49 is identical in construction to the grid 22, as above noted, and includes first and second horizontal grid bars 57 and 58 and parallel guide rods 59 welded thereto. Aligned horizontal holes are drilled in lower portions of front vertical members 50 and in upper portions of back vertical members 51 (at the same respective distances above lower ends of said vertical members as similar holes are provided in upper rack section 16) for receiving threaded end portions of horizontal grid bars 57 and 58 of grid 49. Cap nuts 60 are also applied to the threaded outer ends of said grid bars to snugly press vertical members 50 and 51 against the outermost guide rods 59 of said grid. The bottom ends of vertical members 50 and 51 of lower rack section 17 are supplied with plastic cups 61 for cushioning the lower ends of these members where they rest upon the floor.

As already noted, and as shown in FIGS. 1, 2 and 6, a single lower rack section 17 and a single upper rack section 16 are adapted to be united together to form a sectional convertible rack 15. When an upper rack section is so employed, the short bolts 33 are replaced by long bolts 62 which extend vertically downwardly through holes aligned therewith in the upper horizontal tubular members 53 so when said bolts are tightened, they snugly retain the upper and lower rack sections 16 and 17 in assembled relation.

The table top section 18, with which lower rack section 17 is optionally adapted to be assembled as shown in FIG. 8, includes a rectangular table top 63, which may be made of plywood or other suitable material, and which is equipped at its opposite ends with a pair of shallow inverted U-members 64, flattened, apertured portions of each of which receive screws 65 which rigidly secure member 64 to the table top 63. The members 64 are centrally apertured to receive long bolts 66 the heads 67 of which fit into suitable recesses provided in the lower face of table top 63, and end portions of the U-members 64 are turned downwardly to provide the table top section 18 with four short vertical tubular legs 69 which are made of the same diameter tubing as vertical members of the upper and lower rack sections 16 and 17 and have the same horizontal spacing as said vertical members. It is thus possible to move the table top section 18 downwardly over the lower right section 17 so that the axial tubular extensions 52 of the lower rack section are slidably received by the lower ends of table top section legs 69 while the long bolts 66 extend downwardly through the vertical apertures provided in upper horizontal tubular members 53 of the lower rack section, after which nuts 70 are applied to the lower ends of said bolts and snugged up to retain the lower rack section 17 and table top section 18 in assembled relation as shown in FIG. 8.

The upper and lower rack sections 16 and 17 have been described hereinabove as being assembled with their respective grids 22 and 49 positioned as shown in FIG. 1 for functioning as phonograph-record racks. It is now to be noted that either of the grids 22 or 49 is adapted to be assembled in its respective rack section in an alternate manner as shown in FIGS. 6 and 8 in which grid 49 is shown as assembled in a lower rack section 17 with the entire grid rotated 180° about a transverse axis from the position in which it acts as a record rack so that the first and second horizontal grid bars of the grid change places. This alternate manner of assembly converts the record rack into a flat magazine rack which gives the invention a duality of function optionally available to the owner of this equipment. Where a plurality of sections are assembled in superimposed relation, the option is open to the owner to employ either mode of assembling the grid in any or all of said sections.

While only two rack sections are shown as thus assembled together in the drawings, it is to be understood that any number of lower rack sections 17 may be included in superimposed relation in such an assembly, the number so included depending upon the height to which the upper rack sections may be conveniently reached for inserting records or magazines therein and removing the same therefrom.

The claims are:

1. In a phonograph record envelope rack, the combination of: a pair of parallel horizontally opposed rack ends resting on the floor; a horizontal spacer bar releasably united with said rack ends, at the respective ends of said bar, at corresponding locations a substantial distance below the centers of said rack ends; and a grid including two parallel transverse horizontal bars releasably united with said rack ends, at the respective ends of said grid bars, a first one of said grid bars being located adjacent the front of said rack and at a level slightly above that of said spacer bar, the second of said grid bars being located adjacent the back of said rack at a relatively high level, and a multiple of guide rods united at their lower and upper ends respectively with said first and second grid bars, said rods lying in uniformly spaced parallel planes to form record filing pockets between said planes, said first grid bar and spacer bar providing record envelope bottom rests for each pocket and said second grid bar providing a back record envelope rest for each pocket, said grid-pocket-forming rods being uniformly shaped to incline from their lower ends for a major part of their length at a substantial angle upwardly from the plane common to said grid bars to a level above that of said second grid bar, the remaining upper portions of said rods being bent rearwardly and downwardly towards said plane and the points of their connection with said second grid bar, whereby reversing said grid in assembling said rack, with the first grid bar in the place of the second grid bar and vice versa, causes said grid to function as a flat magazine rack.

2. A combination as recited in claim 1 wherein said rack ends are open frames, each including front and back members upper portions of which are connected and a horizontal member connecting a lower portion of said back member to said front member, said first grid bar being releasably united with said front frame members and said second grid bar being releasably united with said back frame members when said rack is assembled for storing record envelopes, and, vice versa when said rack is assembled for storing magazines, and wherein said spacer bar is releasably united at its respective ends with said horizontal frame members.

3. A combination as recited in claim 2 wherein said front frame member, said back frame member and the connection between their upper portions comprise a single piece of rigid material bent just above said horizontal frame member to lie approximately in the plane of said upwardly inclined portions of said grid rods, and then being bent rearwardly and downwardly about a short radius to form said back frame member.

4. A combination as recited in claim 1 wherein holes are provided in said rack ends for receiving opposite end portions of said grid bars in assembling said rack, the outermost grid rods forming stops limiting the distances said grid bar end portions extend through said holes, said grid bar end portions being threaded; and nuts screwed on said grid bar end portions to releasably unite said rack grid and said rack ends.

References Cited in the file of this patent

UNITED STATES PATENTS

| | | |
|---|---|---|
| D. 176,633 | Ross | Jan. 10, 1956 |
| D. 180,955 | Lyons | Sept. 10, 1957 |
| 1,355,486 | Longenecker | Oct. 12, 1920 |
| 2,239,483 | Cocks | Apr. 22, 1941 |

FOREIGN PATENTS

| | | |
|---|---|---|
| 79,359 | Norway | Nov. 12, 1951 |
| 571,440 | Italy | Jan. 4, 1958 |
| 683,831 | Great Britain | Dec. 3, 1952 |
| 648,864 | Great Britain | Jan. 17, 1951 |